Nov. 27, 1956 A. L. RICH 2,772,356

MULTIVIBRATOR CIRCUIT

Filed Aug. 28, 1952 2 Sheets-Sheet 1

INVENTOR
ALAN L. RICH

BY Joseph Weingarten
ATTORNEY

Nov. 27, 1956 A. L. RICH 2,772,356

MULTIVIBRATOR CIRCUIT

Filed Aug. 28, 1952 2 Sheets-Sheet 2

INVENTOR
ALAN L. RICH

BY Joseph Weingarten
ATTORNEY 2,772,356

MULTIVIBRATOR CIRCUIT

Alan L. Rich, Hyde Park, Mass., assignor to Laboratory For Electronics, Inc., Boston, Mass., a corporation of Delaware Application August 28, 1952, Serial No. 306,851

11 Claims. (Cl. 250—27)

The present invention relates in general to the generation of electric waves and more particularly to a novel multivibrator circuit offering the advantages of precise, high speed and substantially jitter-free operation in the development of rectangular voltage waveforms having exceptionally short rise times.

Broadly speaking, the multivibrator art encompasses many forms of relaxation oscillator circuits having monostable or astable patterns of operation. The so-called "one-shot" multivibrator is a driven oscillator whose cycle of operation is initiated by an externally applied synchronizing triggering potential. In the "free-running" multivibrator, operation is continuous and a periodic voltage waveform of generally rectangular shape is derived as the output signal.

Perhaps the most common and most widely used multivibrator is the basic plate-coupled, free-running circuit which fundamentally is a two stage resistance-capacitance coupled amplifier wherein the output of the second stage is regeneratively and capacitively coupled to the first. The frequency of operation is a function of the various circuit time constants and to a certain extent, the characteristics of the tubes employed and the source potential. With minor modification, as by the application of a cut-off bias potential to one tube, the circuit may be arranged for one-shot operation.

Despite the extensive application of this conventional multivibrator, certain inherent limitations are recognized which preclude successful circuit operation where extremely short switching time is demanded. Consider as a representative example, a conventional multivibrator using common receiving tube triode types and plate load resistors of the order of fifty thousand ohms. The rapidity of circuit response is a function of the time constant of the plate load resistor and stray plate capacitance, and of interelectrode capacities due to Miller effect. With load resistance of this magnitude, clearly, event small capacities play a predominant part in determining switching time. When the generation of delay gate voltages of rectangular form having a rise time of the order of one tenth microsecond and a total duration of a somewhat larger fraction of a microsecond is attempted, a load circuit of this nature renders operation impossible.

Solutions to the problem of circuit operation at high switching speeds as demanded by many present day radar and computation systems have been advanced. The value of circuit load resistance may be reduced; but as a consequence of lower load resistance there is a corresponding decrease in "loop" gain and signal output. Increase in load current is the obvious manner of speeding operation, and in fact, multivibrators have been operated with low resistive loads and transmitting type tubes furnishing the needed high current.

The factors influencing rise time and switching time in the ordinary multivibrator circuit are also determinative of the minimum pulse width, or time delay, which may be achieved. For example, Miller effect is influential in retarding the regenerative action by which a multivibrator tube abruptly changes from a non-conducting state to one of full conduction. Those remedies heretofore available for the reduction of rise time also were effective in reducing minimum delay, but as noted above, not without rendering the circuit expensive, bulky and inefficient in respect of power consumption.

The present invention contemplates and has as a primary object the provision of a circuit of the multivibrator type capable of generating variable short duration rectangular waveforms of high stability having uncommonly steep leading and trailing edges with ordinary low power tube types. In one basic embodiment, this invention uses four triode electron tube sections in a substantially symmetrical configuration wherein conduction is alternately and abruptly switched from one series pair to another. The circuit arrangement is such that all impedances which ordinarily figure in determining the loss of rapid response due to Miller effect are held to extremely low values and yet the circuit has the property of limiting current drain to the extent normal in receiving tube operation. Further, the application of four tubes does not only make it possible to achieve highly useful waveforms, but all tubes serve as amplifiers so that the overall gain is that of four tubes. As will be seen, a substantially constant current no greater than that of two tube multivibrators is taken from the power source.

It is, therefore, another object of the present invention to provide a multivibrator circuit incorporating low circuit impedances arranged to draw a minimum of current while realizing comparatively high amplification.

Still another object of this invention is to provide a multivibrator having a "flat-topped" rectangular output waveform with negligible overshoot and excellent amplitude stability.

A further object of this invention is to provide a multivibrator circuit having the advantageous characteristics enumerated above in operation in free-running or externally triggered embodiments.

These and other objects and advantages of the present invention will best be understood from the following detailed specification when read in connection with the accompanying drawing in which.

Figure 1:
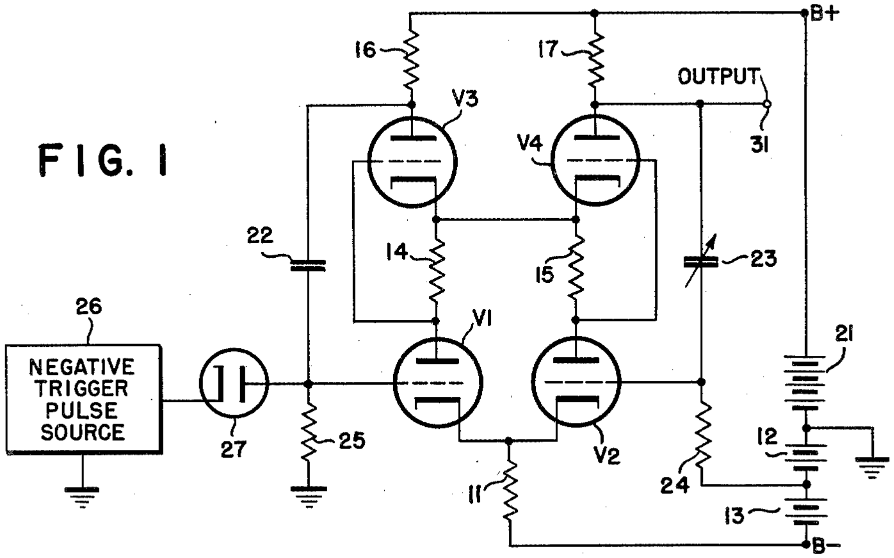
Fig. 1 is a schematic circuit diagram of an embodiment of the novel multivibrator of this invention especially adapted for operation in response to external trigger pulses.
Figure 2:
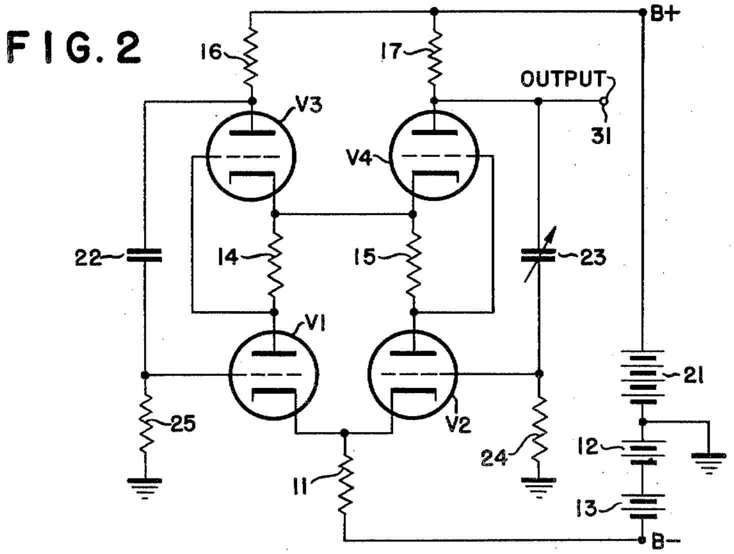
Fig. 2 is a schematic circuit diagram of the present multivibrator in which the fundamental arrangement corresponds to that illustrated in Fig. 1, but which has been modified for demonstration of free-running operation.
Figure 3:
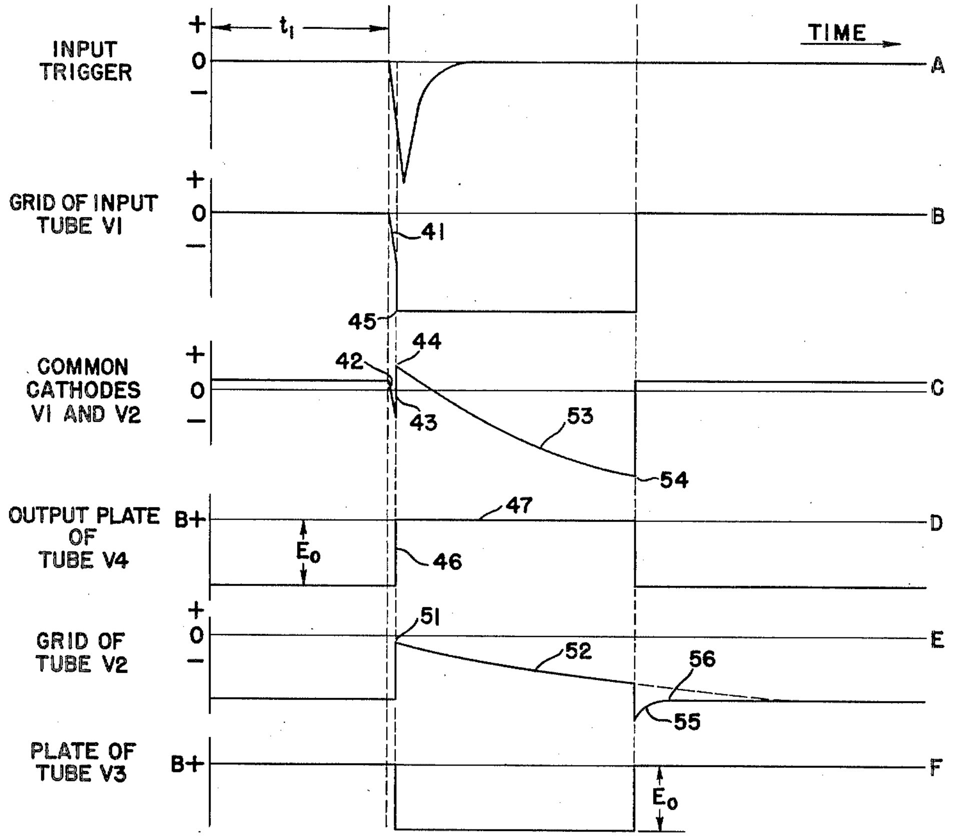
Figure 4:
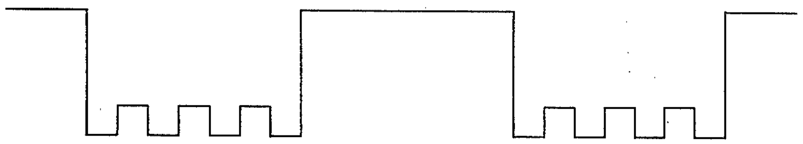

Fig. 3 is a graphical representation of the potential waveforms generated at selected points during operation of the multivibrator whose circuit is illustrated in Fig. 1, prior to, during, and subsequent to the application of a single trigger pulse; and Fig. 4 is a graphical representation of a potential waveform output available under selected conditions of operation of the circuit illustrated in Fig. 2.

With reference now to the drawing and more particularly to Fig. 1 thereof, the physical characteristics of the circuit therein illustrated will first be described and this will be followed by a discussion of the principles of circuit operation and an explanation of the circuit voltage waveforms shown in Fig. 3. Basically, the multivibrator comprises a symmetrical array of four triode electron tubes designated by reference characters V1, V2, V3 and V4. The selection of triodes is a design choice and is not in any way a limitation since other tubes may be used provided, of course, that the necessary potentials for all electrodes are furnished. As illustrated, the cathodes of tubes V1 and V2 are joined in parallel and returned through a common cathode load resistor 11 to a source of potential B—, negative with respect to ground and developed by batteries 12 and 13 in series.

The plates of tubes V1 and V2 are connected through resistors 14 and 15, respectively, to the cathodes of tubes V3 and V4 which are also joined in parallel, and the plates of tubes V3 and V4 are coupled through load resistors 16 and 17 respectively to a potential source B+, positive with respect to ground and furnished by a suitable battery 21. Of course, batteries 12, 13 and 21 may be replaced by any of the other well known direct voltage power sources. In fact, batteries are shown in the drawing only for the purpose of facilitating the tracing of current flow paths through the circuit elements.

As further shown in the drawing, the control grids of tubes V3 and V4 are directly connected to the plates of V1 and V2 respectively, and the control grids of tubes V1 and V2 are respectively coupled to the plates of tubes V3 and V4 by capacitors 22 and 23, the latter of which is shown to be variable for purposes more specifically described hereinbelow.

To this point the various circuit components mentioned have all been symmetrically positioned with respect to the four tubes. However, since the circuit of Fig. 1 is a multivibrator of the one-shot type, an asymmetrical arrangement is used in the grid circuits of tubes V1 and V2. Thus, the control grid of tube V2 is returned through resistor 24 to a negative bias potential as determined by battery 12, which potential is intermediate B— and ground. The control grid of tube V1 is grounded through resistor 25.

In completing the outline of the structure in Fig. 1, a source of negative trigger pulses 26 for actuating the circuit is connected in the embodiment shown through rectifier 27 to the control grid of tube V1. Rectifier 27 which is poled for the transfer of negative pulses to the control grid may be an electron tube diode as shown or a suitable crystal or the like. If the trigger source 26 is inherently of high impedance, the diode may be omitted entirely. Finally, the output waveform of the multivibrator is derived at an output terminal 31 directly connected to the plate of V4. Other output signal points are available and will be mentioned following the discussion of voltage waveforms generated in the circuit.

The explanation of the operation of any multivibrator circuit is at best difficult primarily because many of the key phenomena occur in what might ordinarily be thought of as negligible time. To facilitate a discussion of the operation of the present circuit, the appearance of the circuit under quiescent conditions will first be presented. Whatever current flow is established through the four tubes of necessity creates a voltage drop across resistor 11. Since the control grid of V1 is grounded, and thus initially at zero potential, while the control grid of V2 is negatively biased, the potential of the common cathode connection of V1 and V2 will be determined by tube V1. In actual operation, the current through V1 and, hence, resistor 11 is sufficient to raise the potential at the cathodes of tubes V1 and V2 slightly above ground, and in effect resistor 11 and the B— supply determine the quiescent current. Tube V1 conducts heavily since there is practically zero bias on the tube. The negative potential of the biasing battery 12 is chosen so that with approximately zero potential on the cathode, tube V2 is biased beyond cut-off, and, hence, non-conducting under quiescent conditions.

Since the control grid and cathode of tube V3 are connected to opposite ends of resistor 14 through which the relatively heavy plate current of tube V1 flows, the bias thereby developed is of sufficient magnitude to preclude conduction in tube V3. The control grid and cathode of tube V4 are in like manner connected to opposite ends of resistor 15, but since V2 is cut-off, there is a zero drop across this resistor, or zero bias on tube V4 with the obvious result that tube V4 will be conducting heavily, and the plate of tube V4 will be at a potential less than B+ by the amount of potential drop in load resistor 17. This too is the output potential at terminal 31.

Summarizing then, under quiescent conditions, diagonally opposed tubes V1 and V4 in series will be conducting heavily while tubes V2 and V3 will be cut-off. The quiescent current path may be traced from the positive terminal B+ through resistor 17, tube V4, resistor 14, tube V1, resistor 11 to the negative terminal B—, and through the batteries 13, 12 and 21, all in series relationship. Also under quiescent conditions, since tube V3 is cut-off, capacitor 22 will be charged to the fixed potential B+, while capacitor 23 will be charged to a potential equal to the sum of B+ and the potential of the bias source 12, less the potential drop across resistor 17. Due to the fact that the current is the same in both conducting tubes V1 and V4 and also because their grid biases are substantially alike, the total B+ potential will divide equally if similar tube types are employed.

Prior to discussing the response of the circuit shown to an input trigger, the relative values of the circuit parameters should be considered briefly. It has been noted that the circuit current in the quiescent state will adjust itself so that tube V1 will be operative at substantially zero bias. In other words, a potential drop nearly equal to the source B— will appear across cathode load resistor 11, and accordingly, by selection of value of resistance at this point, which is high relative to the remaining series resistances, including tubes, a constant current effect will be achieved. Since the magnitudes of circuit parameters may be helpful in exemplifying certain phases of circuit operation, particularly where minimum delay gates of steep wave front are desired, it is deemed appropriate here to tabulate the values which have been observed suitable for the solution of a specific delay gate problem:

| | |
|---|---|
| Resistor **11** | 16,500 ohms. |
| Resistors **14** and **15** | 680 ohms. |
| Resistors **16** and **17** | 2,200 ohms. |
| Resistor **25** | 220,000 ohms. |
| Resistor **24** | 22,000 ohms. |
| Capacitor **22** | 1,000 $\mu\mu$f. |
| Capacitor **23** | 20 $\mu\mu$f. |
| Battery **21** | 250 volts. |
| Battery **12** | 22 volts. |
| Batteries **12** and **13** | 150 volts. |
| V1, V2, V3 and V4 | 2 Type 12AT7 Double Triodes. |

Now then, let it be assumed that with the circuit in the quiescent state as established above, a single sharp negative trigger pulse is applied from source 26 through diode 27 to the control grid of tube V1. As will now be set forth, the coaction of two substantially simultaneous effects abruptly initiates conduction through tubes V2 and V3 in series, while practically instantaneously cutting off tubes V1 and V4.

An understanding of the first of these effects may be facilitated by treating the heavily conducting tube V1 as a cathode follower during the instant that the negative going wave front appears on its control grid. Instantaneously then the effect of the negative trigger is to correspondingly drive the cathode of tube V1 (and, hence, the cathode of tube V2) negatively. Since, as disclosed above, the bias on tube V2 was only slightly in excess of that requisite to cut-off tube V2, the latter tube will begin to conduct. Conduction in tube V2 will now establish a voltage across its plate load resistor 15 which functions as a negative bias on tube V4, thereby tending to cut-off the initially conducting tube V4. Current reduction in tube V4 raises its plate voltage toward B+ and this increase, regeneratively coupled through capacitor 23 to the control grid of V2, tends to speed the cycle.

The duration of the initial cathode follower effect in tube V1 is relatively brief because the initiation of conduction in tube V2 shunts the cathode of tube V1 with a low impedance. Under these conditions, tube V1 is then established as a conventional amplifier with plate load resistor 14. The negative applied trigger tends to cut-off tube V1 and thus reduce the current in resistor 14. This in turn removes the cut-off bias from tube V3, conduction in which lowers its plate potential. Consequently, a negative pulse is regeneratively transferred through capacitor 22 to the control grid of tube V1, speeding its cut-off and accelerating the increase in conduction of tube V3.

In the regenerative cycles noted above, when tube V1 is being cut-off by feedback through capacitor 22, its falling grid potential tends to lower the common cathode potential of tubes V1 and V2; while the rising grid potential of tube V2 tends to increase this cathode potential and decrease conduction in tube V1. Were the circuit absolutely symmetrical, these two effects would cancel, but absolute symmetry is unachievable with practical circuit elements. With slight unbalance, one switching action will tend to occur faster or sooner than the other, and this faster action through cathode coupling will speed the slower, whereby in practice, even in the absence of perfect physical symmetry, the total current during the instant of switchover remains constant.

Since there is symmetry of the conducting path through tubes V2 and V3 in series and the path through tubes V1 and V4 in series under quiescent conditions, the result is substantially constant current operation. Also with either path conducting the current drain is essentially that of a single tube, as the two tubes in either path are in series. By virtue of the switchover, the potential at output terminal 31 rises sharply to B+. No overshoot is experienced and a highly desirable rectangular potential step is thus generated.

Having accomplished a switchover, a timing cycle then occurs. But throughout the timing cycle the extent of conduction in tubes V2 and V3 is little changed. Tube V4 remains biased beyond cutoff and a fixed potential (flat-topped) output signal is obtained. The timing cycle of the circuit is wholly dependent on the time constant of the series combination of variable capacitor 23 and resistors 24 and 17. The time constant of capacitor 22 and resistor 25 is not critical to the timing action provided it is relatively long. The function of this circuit is solely to couple pulses appearing at the plate of tube V3 to the control grid of tube V1.

To examine the precise nature of the timing cycle, consider the instant of switchover during which conduction in tube V4 was sharply cut-off. The effect of cut-off is instantly to raise the potential of the upper plate of capacitor 23 to B+ potential, without immediately changing the total charge or potential across the capacitor. This raises the potential on the control grid of tube V2 instantly, but as capacitor 23 then charges to the increased potential, the voltage at the control grid of tube V2 diminishes in a substantially exponential manner. The drop in grid potential is accompanied by a similar reduction in the potential of the common cathodes of tubes V1 and V2 with little change in grid bias and series current due to cathode follower effect until the bias change causes tube V1 to conduct again. At this point, tube V2 operates as an amplifier with considerable gain, whereby its plate voltage rises rapidly, and because of the direct coupling to the control grid of tube V4, conduction begins in the latter tube.

Essentially the reverse of the initial triggering action now occurs. Conduction in tube V1 causes the drop in resistor 14 to tend to cut-off tube V3. This action is in turn regeneratively coupled through capacitor 22 to tube V1 to accelerate the cycle. Conduction in tube V4 is also accompanied by regenerative coupling through capacitor 23 to tube V2 in a sense which speeds its cut-off. In short, at the instant that conduction is re-established in tube V2, the circuit aided by the regenerative actions above stated, abruptly returns to the initial state of conduction in the series path through tubes V1 and V4 while tubes V2 and V3 are completely cut-off.

The return of tube V4 to a conductive state sharply drops the potential at output terminal 31, thereby terminating the generation of the output voltage step. Capacitor 23 now rapidly discharges to this new potential value, and the circuit is thus restored to its quiescent state to await the application of another trigger pulse. By the adjustment of variable capacitor 23, or by otherwise altering the time constant of its circuit, the time duration, or width, of the output pulse may be varied.

The cycle of operation of the multivibrator circuit of Fig. 1 is illustrated graphically in Fig. 3, and reference is now made thereto. In this figure, there are plotted on a common time scale the various potential waveforms developed at selected points in the circuit, and for explanatory purposes the time axis during initial switching has been greatly exaggerated.

During the time interval $t_1$ the circuit of Fig. 1 is operative under the quiescent conditions described above. Thus, the input trigger potential is zero, Fig. 3(A); the grid potential on tube V1 is zero, Fig. 3(B); the common cathodes are operative at a potential slightly above ground, Fig. 3(C); the output potential which is the potential at the plate of tube V4 is at a value $E_0$ below B+, $E_0$ being the voltage drop across load resistor 17, Fig. 3(D); and the bias equal to the negative potential of battery 12 is shown as appearing on the control grid of tube V2 in Fig. 3(E).

Upon the application of a negative trigger shown in Fig. 3(A), the grid of tube V1 and the cathodes of tubes V1 and V2 are driven negative as shown at 41 and 42 in Fig. 3(B) and (C) respectively. But as soon as tube V2 begins to conduct, the common cathode potential again rises, and this is illustrated at 43 in Fig. 3(C) and at a time corresponding to point 44 on the cathode potential waveform, the conduction cycle has been switched from tubes V1 and V4 to tubes V2 and V3. Regenerative coupling from the plate of tube V3 to the grid of tube V1 drives this grid potential down to the negative value shown at 45, Fig. 3(B), and since, as presented above, the time constant of the grid coupling circuit is relatively long, the potential thereat remains reasonably constant for the remainder of the cycle.

The output voltage Fig. 3(D) is switched to B+ to generate a step of magnitude $E_0$ instantaneously as tube V4 is cut-off. No attempt has been made to draw the slope of the rise in output potential at 46 to any particular scale in view of the rapidity of the switching cycle. The output waveform is uniformly flat at 47 because the output potential will remain at B+ as long as tube V4 is cut-off.

With respect to tube V2, the grid potential rises to point 51, Fig. 3(E), from which point the potential decays exponentially to the point where reversal of the cycle of conduction occurs. This potential reduction, shown at 52 in Fig. 3(E), is reflected to the common cathodes as shown at 53 in Fig. 3(C) and at point 54 the cathode potential is sufficiently low to permit conduction in V1 and reversal of the cycle.

In Fig. 3(F) there is plotted the potential which appears at the plate of tube V3. If the circuit is symmetrical to the extent that resistors 16 and 17 are equal, this waveform will be the complement of the waveform appearing at the plate of tube V4, as illustrated in Fig. 3(D). No attempt has been made to illustrate the precise nature of the waveforms during the time necessary to return the circuit to its quiescent state. The comparatively small overshoot shown at 55 in Fig. 3(E) represents the rapid discharge of variable capacitor 23 and at a time represented by point 56 the circuit has been fully restored and is ready to be triggered again.

Throughout the previous discussion of the structure and operation of the circuit illustrated in Fig. 1, emphasis has been placed upon the unusually rapid rise time and the comparatively short time duration of the output pulse achievable. To illustrate this, a circuit constructed in accordance with the schematic of Fig. 1 and employing components of the values tabulated earlier, has been demonstrated capable of providing a rectangular output pulse of the order of twenty volts amplitude and having a pulse width variable between four-tenths microsecond to five microseconds. Of special importance, however, is the fact that this pulse has a rise time of the order of one-tenth microsecond in duration. Pulses of lesser time duration with equally short rise times may also be achieved by the circuit shown. Although terminal 31 has been designated as the output, a negative pulse may be taken from the plate of tube V3, a sawtooth wave may be taken from the cathodes of tubes V1 and V2, and a sharp negative delayed pulse from the common cathodes of tubes V3 and V4.

Output characteristics such as these were unattainable with circuits heretofore available and have been achieved principally because the novel design permits the use of low resistance values in the plate circuits of tubes V1 and V2 and because direct coupling is utilized between the plates of these tubes and the control grids of tubes V3 and V4 respectively. With load impedances of this magnitude, the Miller effect is sufficiently minimized as to have practically no material influence upon switching time and the output potential rise or fall times.

Comparatively little modification is required to render a multivibrator circuit incorporating the principles described in connection with Fig. 1 free running. In Fig. 2 there is illustrated a circuit which has been altered to the extent that the negative trigger pulse source 26 and the coupling diode 27 have been removed, while resistor 24 has been returned to ground rather than to a bias potential. To illustrate the similarity of the two circuits, corresponding elements have been designated by like reference numerals throughout. The principles of operation of the circuit shown in Fig. 2 are fundamentally the same as those already discussed in connection with Fig. 1; however, since one tube is no longer held cut-off by a fixed bias potential, the circuit in Fig. 2 oscillates continuously and a periodic square wave is available at the output terminal. In the event that the parameters of the circuit shown in Fig. 2 are symmetrically arranged, both positive and negative cycles of the output rectangular wave will be equal in magnitude and time duration. Timing operations are controllable by variations in either or both combinations of resistor 24 and capacitor 23, and resistor 25 and capacitor 22. If the time constant of the circuit containing capacitor 23 in Fig. 2 is made much greater or much smaller than the time constant of the circuit including capacitor 22, a double mode of oscillation having an output waveform as illustrated graphically in Fig. 4, will be obtained.

Those advantages hereinabove mentioned as inherent in the multivibrator shown in Fig. 1 are also apparent in the circuit shown in Fig. 2. It is possible to generate a periodic rectangular wave in which positive or negative cycles or both are of a time duration of less than one microsecond while the rise and fall of the rectangular wave occurs in less than one-tenth microsecond. The circuit of Fig. 2 is therefore highly advantageous where rapid switching or precise rectangular waveforms are desired.

Modifications of the circuits of Figs. 1 and 2 in the light of the foregoing disclosure may of course now become obvious to those skilled in this art. It will be understood, therefore, that the scope of the present invention is to be regarded as subject only to those limitations of the appended claims.

What is claimed is:

1. A multivibrator circuit comprising first and second pairs of serially connected electron tubes energized in parallel from a potential source, means for rendering conductive both tubes in said first electron tube pair, means for initiating conduction in both electron tubes in said second electron tube pair, and means intercoupling said first and second tube pairs whereby conduction in said second tube pair substantially instantaneously terminates conduction in both tubes of said first tube pair.

2. A multivibrator circuit comprising first, second, third and fourth electron tubes energized at substantially constant current from a potential source, couplng means arranged whereby the initiation of conduction serially through said first and fourth tubes tends to terminate conduction in said third and second tubes respectively and whereby the initiation of conduction serially through said second and third tubes tends to terminate conduction in said fourth and first tubes respectively.

3. A multivibrator circuit comprising, in combination, first, second, third and fourth electron tubes energized from a potential source, direct coupling means for transferring the outputs of said first and second tubes to the inputs of said third and fourth tubes respectively, capacitive coupling means for transferring the output of said third tube to the input of said first tube, and means having a predetermined time constant for transferring the output of said fourth tube to the input of said second tube and controlling the period of said circuit.

4. Apparatus as in claim 3 and additional means for rendering said first and fourth tubes quiescently conductive and said second and third tubes quiescently non-conductive.

5. A triggered multivibrator comprising the combination of four electron tubes energized from a potential source, two of said tubes being quiescently conductive in series relationship, coupling means transferring potentials from said conductive tubes for rendering said remaining two tubes quiescently non-conductive, means for triggering one of said quiescently conductive tubes thereby reducing the extent of conduction therein and initiating conduction in said quiescently non-conductive tubes, coupling means regeneratively transferring potentials from said last-mentioned tubes tending to cut-off said quiescently conductive tubes, and a timing circuit for determining the period of conduction in said quiescently non-conductive tubes.

6. A multivibrator circuit comprising the combination of first, second, third and fourth electron tubes each having at least a cathode, an anode and a control grid, a potential source having positive and negative terminals, said cathodes of said first and second electron tubes being connected in parallel and resistively coupled to said negative terminal of said potential source, said cathodes of said third and fourth electron tubes being connected in parallel and resistively coupled to said anodes of said first and second electron tubes, means resistively coupling said anodes of said third and fourth electron tubes to said positive terminal of said potential source, means resistively coupling the control grid of said first electron tube to a reference potential point intermediate said positive and negative terminals, means resistively coupling the control grid of said second electron tube to a reference potential intermediate said positive and negative terminals, means capacitively coupling said control grids of said first and second electron tubes respectively to said anodes of said third and fourth electron tubes, and means directly coupling said control grids of said third and fourth electron tubes respectively to said anodes of said first and second electron tubes.

7. A multivibrator circuit comprising the combination of first, second, third and fourth electron tubes each having at least an anode, a cathode and a control grid, a potential source having positive and negative terminals, means coupling said cathodes of said first and second tubes in parallel and to said negative terminal of said potential source, means coupling said anodes of said third and fourth tubes to said positive terminals of said potential source, means coupling said cathodes of said third and fourth tubes to said anodes of said first and second tubes respectively, bias establishing means whereby said first and third tubes are rendered normally conducting and said second and third tubes normally non-conducting, means coupling the anodes of said first and second tubes to the control grids of said third and fourth tubes respectively, means coupling said anodes of said third and fourth tubes to said control grids of said first and second tubes respectively, and means for cutting off normal conduction for triggering said circuit.

8. A multivibrator circuit comprising the combination of first, second, third and fourth electron tubes each having at least a cathode, an anode, and a control grid, a potential source having positive and negative terminals, said cathodes of said first and second electron tubes being connected in parallel and resistively coupled to said negative terminal of said potential source, said cathodes of said third and fourth electron tubes being joined in parallel and resistively connected to said anodes of said first and second electron tubes, means resistively coupling said anodes of said third and fourth electron tubes to said positive terminal of said potential source, means directly connecting said control grids of said third and fourth electron tubes respectively to said anodes of said first and second electron tubes, means capacitively coupling said control grids of said first and second electron tubes respectively to said anodes of said third and fourth electron tubes, means resistively connecting said control grid of said second electron tube to a first potential point intermediate said positive and negative terminals, means resistively connecting said control grid of said first electron tube to a second potential point intermediate said first potential point and said positive terminal, and means for applying a triggering potential to said control grid of said first electron tube.

9. Apparatus as in claim 5 wherein said timing circuit includes resistive and capacitive components in series, and means for adjusting at least one of said last-mentioned components.

10. A multivibrator comprising, the combination of first and second series pairs of electron tubes energized from a potential source, coupling means transferring potentials from said first series pair of tubes when conductive for rendering both tubes in said second series pair non-conductive, means for initiating conduction in said second series pair of tubes, coupling means regeneratively transferring potentials from said second series pair of tubes upon the initiation of conduction therein tending to cut off conduction in both tubes of said first series pair, and timing means establishing the relative periods of conduction and non-conduction in said first and second series pairs of tubes.

11. A free-running multivibrator circuit comprising, the combination of first, second, third and fourth electron tubes each having cathode, anode and control grid, a potential source having positive and negative terminals, said cathodes of said first and second electron tubes being connected in parallel and resistively coupled to said negative terminal of said potential source, said cathodes of said third and fourth electron tubes being joined in parallel and resistively connected to said anodes of said first and second electron tubes, means resistively coupling said anodes of said third and fourth electron tubes to said positive terminal of said potential source, means directly connecting said control grids of said third and fourth electron tubes respectively to said anodes of said first and second electron tubes, means capacitively coupling said control grids of said first and second electron tubes respectively to said anodes of said third and fourth electron tubes, and means resistively connecting said control grids of said first and second electron tubes to a potential point intermediate said positive and negative terminals.

References Cited in the file of this patent

UNITED STATES PATENTS

| | | |
|---|---|---|
| 2,366,357 | Schlesinger | Jan. 2, 1945 |
| 2,562,530 | Dickinson | July 31, 1951 |